United States Patent
Kim (10) Patent No.: US 10,562,566 B2
(45) Date of Patent: Feb. 18, 2020

(54) APPARATUS AND METHOD FOR COMPENSATING TORQUE OF MOTOR-DRIVEN POWER STEERING SYSTEM

(71) Applicant: HYUNDAI MOBIS CO., LTD., Seoul (KR)

(72) Inventor: Tae Hong Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/821,689

(22) Filed: Nov. 22, 2017

(65) Prior Publication Data

US 2019/0002022 A1    Jan. 3, 2019

(30) Foreign Application Priority Data

Jun. 30, 2017  (KR) .................. 10-2017-0083140

(51) Int. Cl.
| | |
|---|---|
| *B62D 6/00* | (2006.01) |
| *B62D 6/10* | (2006.01) |
| *B62D 6/02* | (2006.01) |
| *B62D 5/04* | (2006.01) |

(52) U.S. Cl.
CPC .......... *B62D 6/008* (2013.01); *B62D 5/0472* (2013.01); *B62D 6/02* (2013.01); *B62D 6/10* (2013.01)

(58) Field of Classification Search
USPC ........................................................ 701/41
See application file for complete search history.

(56) References Cited

U.S. PATENT DOCUMENTS

| | | | |
|---|---|---|---|
| 2004/0162655 A1* | 8/2004 | Patankar | B62D 5/0463 701/41 |
| 2008/0033613 A1* | 2/2008 | Tamaizumi | B62D 5/0463 701/41 |
| 2011/0209939 A1* | 9/2011 | Ono | B62D 5/008 180/447 |
| 2017/0203782 A1* | 7/2017 | Yamanaka | B62D 5/04 |
| 2018/0201306 A1* | 7/2018 | Tsubaki | B62D 1/286 |

FOREIGN PATENT DOCUMENTS

KR     10-2005-0046726 A       5/2005

* cited by examiner

*Primary Examiner* — Lail A Kleinman
*Assistant Examiner* — Mahmoud M Kazimi
(74) *Attorney, Agent, or Firm* — Knobbe Martens Olson & Bear LLP (57) ABSTRACT

An apparatus for compensating a torque of a motor-driven power steering system includes a column torque sensor detecting a column torque applied to a steering shaft; a vehicle speed sensor detecting a vehicle speed; a steering angle sensor detecting a steering angle velocity of a steering wheel; and a control unit suitable for calculating a high frequency assist gain for controlling a high frequency region of the column torque by receiving the column torque and the vehicle speed, determining whether a steering state is a steering reversal state, based on the steering angle velocity received from the steering angle sensor and motor current applied from an MDPS motor, compensating the high frequency assist gain depending on a result of determination, and compensating a high frequency characteristic of an assist torque calculated from the column torque and the vehicle speed, by using the compensated high frequency assist gain.

13 Claims, 5 Drawing Sheets

FIG. 5

APPARATUS AND METHOD FOR COMPENSATING TORQUE OF MOTOR-DRIVEN POWER STEERING SYSTEM

CROSS-REFERENCE TO RELATED APPLICATION

The present application claims priority under 35 U.S.C. § 119(a) to Korean Patent Application No. 10-2017-0083140 filed on Jun. 30, 2017 in the Korean Intellectual Property Office, which is incorporated herein by reference in its entirety.

BACKGROUND

1. Technical Field

Embodiments of the present disclosure relate to an apparatus and a method for compensating a torque of a motor-driven power steering system, and more particularly, to an apparatus and a method for compensating a torque of a motor-driven power steering system, for improving a steering feel of a driver.

2. Related Art

A motor-driven power steering (MDPS) system of a vehicle is an apparatus which facilitates steering by providing a portion of a steering torque that a driver should apply to a steering wheel when steering the vehicle, by using an auxiliary power source.

A steering intention of the driver is sensed through a torque sensor which is directly coupled to the steering wheel, and a corresponding signal is transferred to the MDPS system. The MDPS system drives an electric motor to provide an appropriate force in consideration of a current vehicle speed, etc., thereby assisting in the steering force of the driver. The MDPS system reduces a force required to the driver by assisting a large force when the vehicle is parked or stopped or is driven at a low speed, and maintains the stability of a vehicle body by assisting only a small force when the vehicle is driven at a high speed.

Meanwhile, in the vehicle equipped with such an MDPS system, a system for improving a steering feel that is felt by the driver through the steering wheel, depending on a steering state of the driver, is demanded. In particular, in the case where the driver reverses steering, a problem may be caused in that an instantaneous load is generated due to friction, inertia or lack of responsiveness of an MDPS motor in a mechanism provided to the MDPS system and thereby the driver feels a sticky steering feel. Moreover, in the case where the driver holds the steering wheel, a problem may be caused in that fine vibration and noise are transferred through the steering wheel due to noise in a torque sensor and a current sensor which senses the current of the MDPS motor and thereby a steering feel of the driver deteriorates.

A background art of the present disclosure is disclosed in Korean Unexamined Patent Publication No. 2005-0046726 (dated May 18, 2005).

SUMMARY

Various embodiments are directed to an apparatus and a method for compensating a torque of a motor-driven power steering system, for improving a steering feel of a driver by eliminating a sense of steering incongruity felt by the driver in the case where a steering state of a steering wheel is a steering reversal state or a steering holding state.

In an embodiment, an apparatus for compensating a torque of a motor-driven power steering system may include: a column torque sensor detecting a column torque applied to a steering shaft; a vehicle speed sensor detecting a vehicle speed of a vehicle; a steering angle sensor detecting a steering angle velocity of a steering wheel; and a control unit suitable for calculating a high frequency assist gain for controlling a high frequency region of the column torque by receiving the column torque and the vehicle speed from the column torque sensor and the vehicle speed sensor, respectively, determining whether a steering state of the steering wheel is a steering reversal state or not, based on the steering angle velocity received from the steering angle sensor and motor current applied from an MDPS (motor-driven power steering) motor, compensating the high frequency assist gain depending on a result of determination, and compensating a high frequency characteristic of an assist torque calculated from the column torque and the vehicle speed, by using the compensated high frequency assist gain.

The control unit may determine that a steering state of the steering wheel is the steering reversal state, when a steering angle acceleration calculated by differentiating the steering angle velocity with respect to time converges to a value of 0 and a magnitude of the motor current is equal to or larger than a predetermined reference.

The control unit may upwardly compensate the high frequency assist gain in the case where a steering state of the steering wheel is the steering reversal state, and may compensate the high frequency assist gain by maintaining it as it is in the case where a steering state of the steering wheel is not the steering reversal state.

The control unit may determine a compensation characteristic of a compensation filter based on the column torque and the vehicle speed, and may compensate the high frequency characteristic of the assist torque by using the compensation filter of which compensation characteristic is determined and the compensated high frequency assist gain.

The compensation filter may include a first compensation filter and a second compensation filter. The control unit may primarily compensate the assist torque through the first compensation filter, and may secondarily compensate a result of adding the primarily compensated assist torque and the compensated high frequency assist gain, through the second compensation filter.

The control unit may determine a compensation characteristic of the second compensation filter as a lag filter characteristic when the column torque is smaller than a predetermined reference torque and as a lead filter characteristic when the column torque is equal to or larger then the predetermined reference torque, and may determine a compensation characteristic of the first compensation filter complementarily to the compensation characteristic of the second compensation filter.

The control unit may eliminate high frequency noise of the assist torque of which high frequency characteristic is compensated, by filtering the assist torque of which high frequency characteristic is compensated, through a variable low pass filter (VLPF) of which cutoff frequency is variable.

The control unit may variably adjust the cutoff frequency of the variable low pass filter based on the steering angle velocity and the vehicle speed.

The control unit may adjust the cutoff frequency of the variable low pass filter to a value equal to or smaller than a predetermined reference frequency, in the case where a steering state of the steering wheel determined based on the steering angle velocity is a steering holding state.

In an embodiment, a method for compensating a torque of a motor-driven power steering system may include: calculating, based on a column torque applied to a steering shaft and a vehicle speed of a vehicle, a high frequency assist gain for controlling a high frequency region of the column torque, by a control unit; determining whether a steering state of a steering wheel is a steering reversal state or not, based on a steering angle velocity of the steering wheel and motor current applied to an MDPS (motor-driven power steering) motor, and compensating the high frequency assist gain depending on a result of the determining, by the control unit; and compensating a high frequency characteristic of an assist torque calculated from the column torque and the vehicle speed, by using the compensated high frequency assist gain, by the control unit.

According to the embodiments of the present disclosure, without using a separate mechanical apparatus for improving a steering feel of a driver, a steering feel of a driver in a steering reversal state or a steering holding state may be improved by applying only a logic which compensates a frequency characteristic of a column torque, and the steering feel of the driver may be optimized in real time by variably compensating the frequency characteristic of the column torque depending on a steering state of the driver.

DETAILED DESCRIPTION

Hereinafter, an apparatus and a method for compensating a torque of a motor-driven power steering system will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
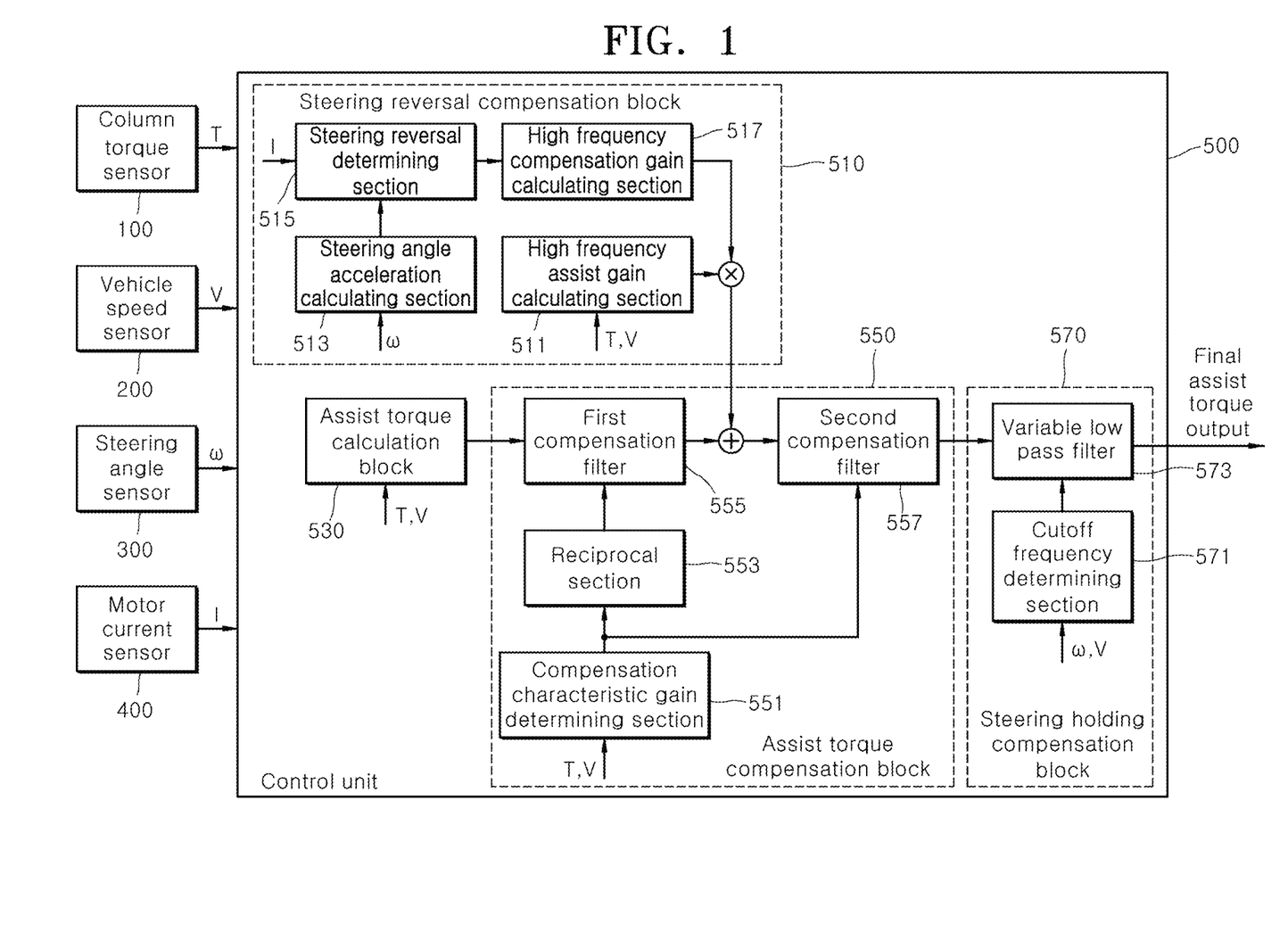
FIG. 1 is a block configuration diagram to assist in the explanation of an apparatus for compensating a torque of a motor-driven power steering system in accordance with an embodiment of the present disclosure.
Figure 2:
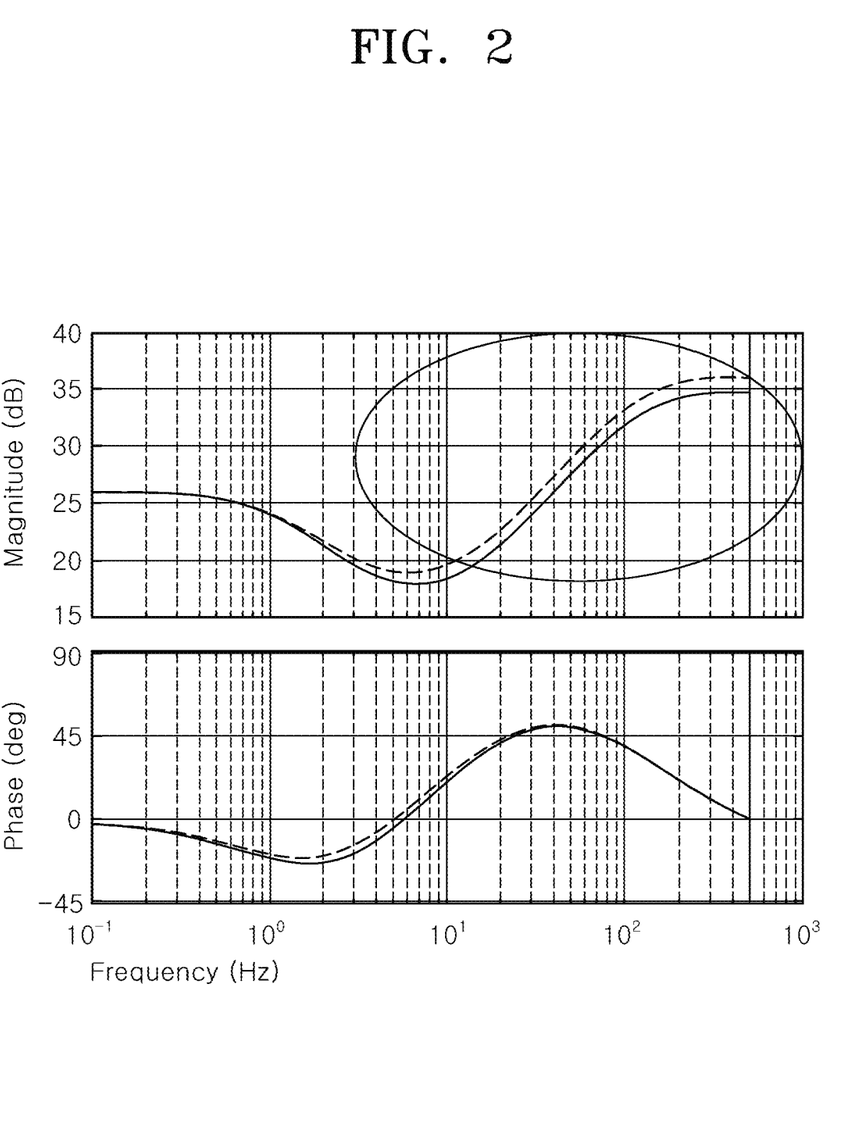
FIG. 2 is a Bode diagram showing an output variation at the time of steering reversal in the apparatus for compensating a torque of a motor-driven power steering system in accordance with the embodiment of the present disclosure.
Figure 3:
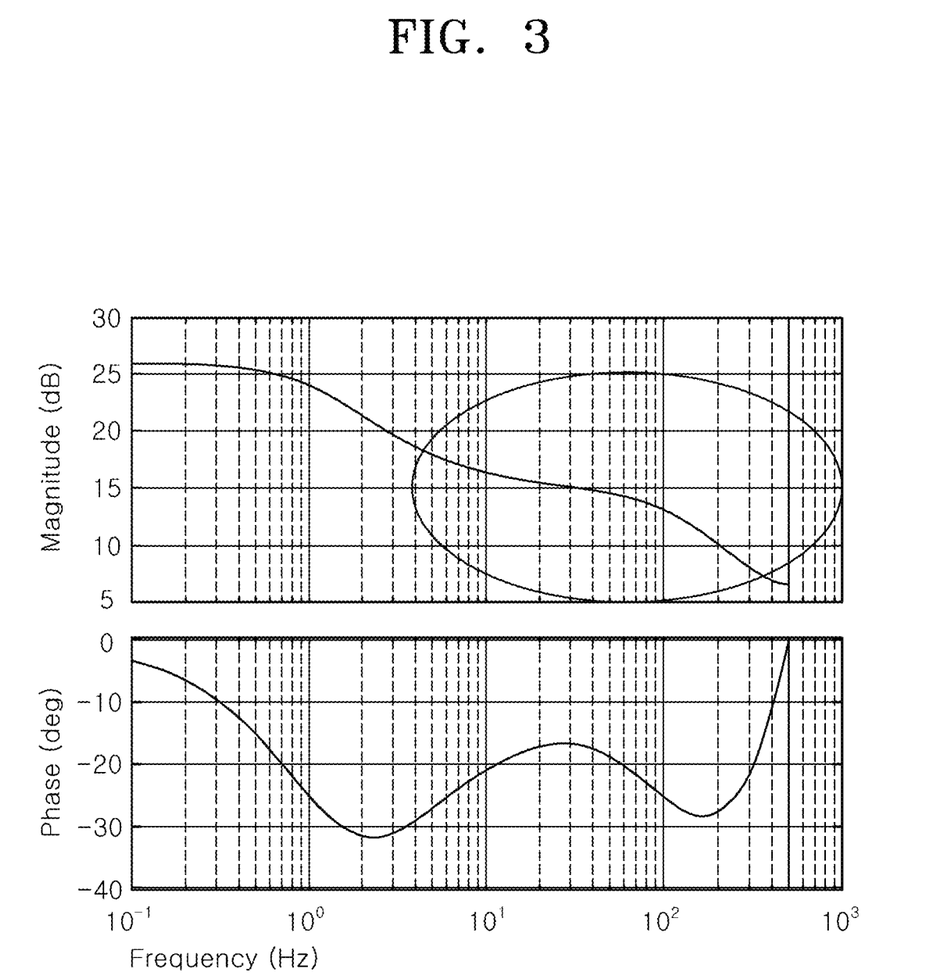
FIG. 3 is a Bode diagram showing an output variation at the time of steering holding in the apparatus for compensating a torque of a motor-driven power steering system in accordance with the embodiment of the present disclosure.
Figure 4:
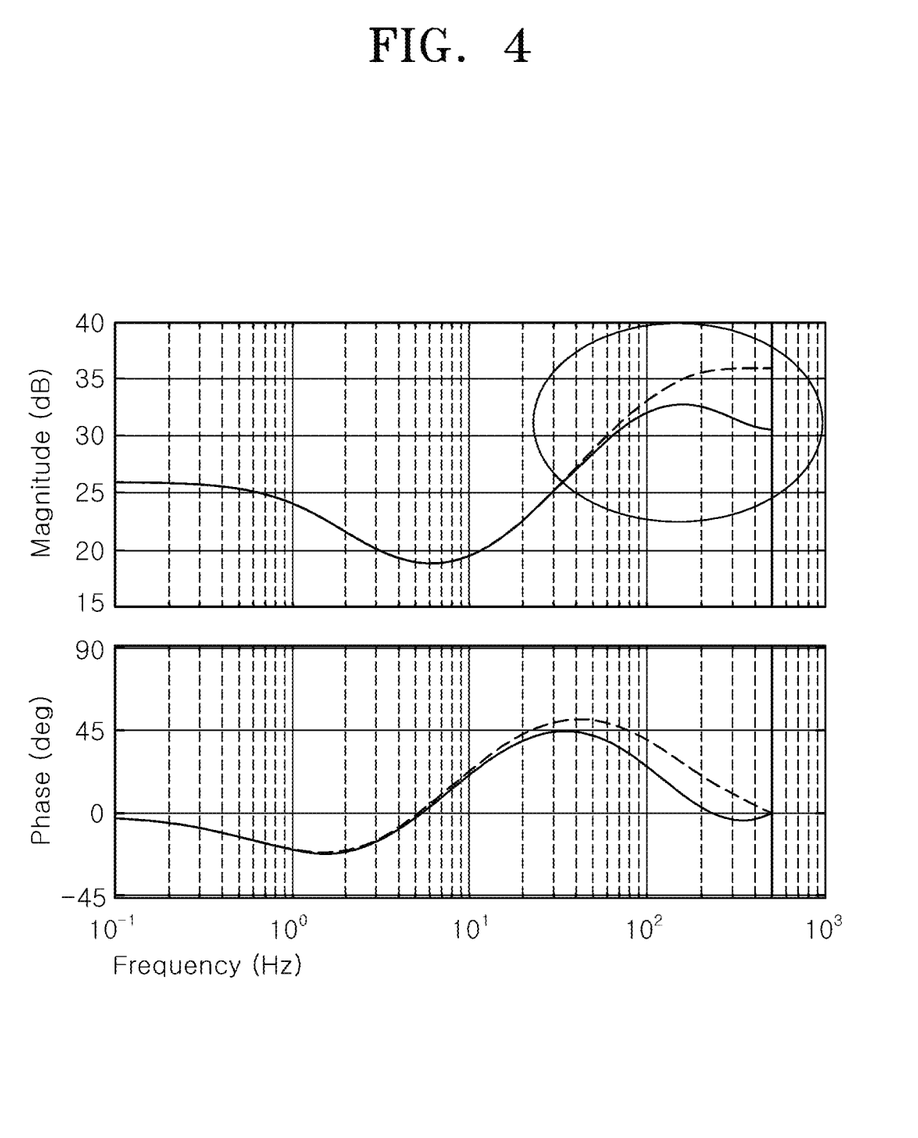
FIG. 4 is a Bode diagram showing an output variation at the time of normal steering in the apparatus for compensating a torque of a motor-driven power steering system in accordance with the embodiment of the present disclosure.

FIG. 1 is a block configuration diagram to assist in the explanation of an apparatus for compensating a torque of a motor-driven power steering system in accordance with an embodiment of the present disclosure, FIG. 2 is a Bode diagram showing an output variation at the time of steering reversal in the apparatus for compensating a torque of a motor-driven power steering system in accordance with the embodiment of the present disclosure, FIG. 3 is a Bode diagram showing an output variation at the time of steering holding in the apparatus for compensating a torque of a motor-driven power steering system in accordance with the embodiment of the present disclosure, and FIG. 4 is a Bode diagram showing an output variation at the time of normal steering in the apparatus for compensating a torque of a motor-driven power steering system in accordance with the embodiment of the present disclosure.

Referring to FIG. 1, the apparatus for compensating a torque of a motor-driven power steering system in accordance with the embodiment of the present disclosure may include a column torque sensor 100, a vehicle speed sensor 200, a steering angle sensor 300, a motor current sensor 400 and a control unit 500. The control unit 500 may include a steering reversal compensation block 510, an assist torque calculation block 530, an assist torque compensation block 550 and a steering holding compensation block 570.

The column torque sensor 100 may detect a column torque T that is applied to a steering shaft as a driver steers a steering wheel and transfer the column torque T to the control unit 500 which is to be described later in detail. The column torque T detected by the column torque sensor 100 may be used in calculating, as will be described later, an assist torque for driving an MDPS motor and a high frequency assist gain for compensating a high frequency characteristic of the assist torque.

The vehicle speed sensor 200 may detect a vehicle speed V of a vehicle and transfer the vehicle speed V to the control unit 500. As the vehicle speed sensor 200, all of various sensors such as a sensor which detects a vehicle speed using a rotation speed of a wheel, a sensor which detects a vehicle speed by measuring an rpm (revolutions per minute) of an engine and a sensor which detects a vehicle speed using a global positioning system (GPS) may be included. Since the MDPS system performs the functions of reducing a force required to the driver by assisting a large force when the vehicle is driven at a low speed and maintaining the stability of a vehicle body by assisting only a small force when the vehicle is driven at a high speed, the vehicle speed V detected by the vehicle speed sensor 200 may serve as a parameter that is considered in calculating the assist torque, the high frequency assist gain and a compensation characteristic gain that is to be described later.

The steering angle sensor 300 may detect a steering angle velocity ω of the steering wheel and transfer the steering angle velocity ω to the control unit 500 which is to be described later in detail. The steering angle sensor 300 may detect a steering angle velocity ω by including an optical sensor or may detect a steering angle velocity ω by measuring a steering angle and differentiating the steering angle with respect to time. The steering angle velocity ω detected by the steering angle sensor 300 may be used to determine, as will be described later, whether a steering state of the steering wheel is a steering reversal state or not, and may be used to variably adjust a cutoff frequency of a variable low pass filter.

The motor current sensor 400 may detect a motor current I which is applied to the MDPS motor and transfer the motor current I to the control unit 500. The motor current I detected by the motor current sensor 400 may be used to determine, as will be described later, whether a steering state of the steering wheel is the steering reversal state.

The control unit 500 may compensate a frequency characteristic of the assist torque calculated from the column torque T and the vehicle speed V. To this end, the control unit 500 may include the steering reversal compensation block 510, the assist torque calculation block 530, the assist torque compensation block 550 and the steering holding compensation block 570. The functions of the respective components may be outlined as follows.

The steering reversal compensation block 510 may compensate the high frequency characteristic of the assist torque in the case where a steering state of the steering wheel is the steering reversal state, thereby reducing a sticky steering feel felt by the driver as an instantaneous load is generated due to friction, inertia or lack of responsiveness of the MDPS motor in a mechanism at the time of steering reversal.

The assist torque calculation block 530 may receive the column torque T and the vehicle speed V from the column torque sensor 100 and the vehicle speed sensor 200, respectively, and may calculate the assist torque to assist in an electric power steering apparatus.

The assist torque compensation block 550 may play the role of compensating the entire frequency characteristic of the assist torque. That is to say, the assist torque compensation block 550 may play the role of avoiding a resonance point of the system and determining a compensation characteristic of a compensation filter which is to be described later, depending on the magnitude of the column torque T, thereby optimizing a steering feel of the driver.

The steering holding compensation block 570 may eliminate the vibration of the steering wheel due to the noise of the column torque sensor 100 and the motor current sensor 400 in the case where a steering state of the steering wheel is a steering holding state, and further, may play the role of eliminating the high frequency region noise of the assist torque of which high frequency characteristic is compensated by the assist torque compensation block 550.

The steering reversal compensation block 510, the assist torque compensation block 550 and the steering holding compensation block 570 may function by being combined organically as shown in FIG. 1 and play the role of improving a steering feel of the driver. Hereinbelow, a process for the control unit 500 to compensate the frequency characteristic of the assist torque through the respective above-mentioned components will be described in detail.

First, descriptions will be made for the steering reversal compensation block 510.

In the MDPS system, in order to cope with a responsiveness deterioration phenomenon of the MDPS motor due to friction or inertia of the mechanism, it is necessary to increase the responsiveness of a high frequency region. In this regard, in the case where the high frequency assist gain for controlling the high frequency region of the column torque T is uniformly upwardly compensated irrespective of a steering state of the steering wheel, vibration may be generated more easily as even the noise caused due to a road surface or a mechanical characteristic is amplified. In order to prevent such a problem, in the present embodiment, by compensating the high frequency assist gain only at the time of steering reversal through the steering reversal compensation block 510, a steering feel of the driver may be improved.

As shown in FIG. 1, the steering reversal compensation block 510 may include a high frequency assist gain calculating section 511, a steering angle acceleration calculating section 513, a steering reversal determining section 515 and a high frequency compensation gain calculating section 517.

The high frequency assist gain calculating section 511 may receive the column torque T and the vehicle speed V from the column torque sensor 100 and the vehicle speed sensor 200, respectively, and may calculate the high frequency assist gain for controlling the high frequency region of the column torque T. The high frequency assist gain as a parameter for improving the degree of individual control freedom in the high frequency region of the assist torque and thereby realizing quick responsiveness and various steering feels may be upwardly compensated by a high frequency compensation gain and be secondarily compensated by being added with a primarily compensated assist torque.

The steering angle acceleration calculating section 513 may calculate a steering angle acceleration by differentiating the steering angle velocity ω received from the steering angle sensor 300, with respect to time.

The steering reversal determining section 515 may determine whether a steering state of the steering wheel is the steering reversal state or not, based on the steering angle acceleration received from the steering angle acceleration calculating section 513 and the motor current I received from the motor current sensor 400. The steering reversal determining section 515 may determine that a steering state of the steering wheel is the steering reversal state, when the steering angle acceleration converges to the value of 0 and the magnitude of the motor current I is equal to or larger than a predetermined reference. The steering reversal determining section 515 may transfer a result of determining whether a steering state of the steering wheel is the steering reversal state, to the high frequency compensation gain calculating section 517.

The high frequency compensation gain calculating section 517 may receive the result of determining whether a steering state of the steering wheel is the steering reversal state, from the steering reversal determining section 515, and may calculate the high frequency compensation gain for compensating the high frequency assist gain. Values of the high frequency compensation gain may be designed variously based on experimental results depending on the specification of a vehicle or an MDPS system and a designer's intention, and may be set in advance in the high frequency compensation gain calculating section 517. The high frequency compensation gain calculating section 517 may calculate the high frequency compensation gain of a value for upwardly compensating the high frequency assist gain in the case where a steering state of the steering wheel is the steering reversal state (e.g.: the high frequency compensation gain>1), and may calculate the high frequency compensation gain of a value for maintaining the high frequency assist gain calculated by the high frequency assist gain calculating section 511 in the case where a steering state of the steering wheel is not the steering reversal state (e.g.: the high frequency compensation gain=1).

The steering reversal compensation block 510 may compensate a high frequency assist gain by multiplying the high frequency assist gain and the high frequency compensation gain calculated as described above. Accordingly, the steering reversal compensation block 510 may upwardly compensate the high frequency assist gain in the case where a steering state of the steering wheel is the steering reversal state, and may compensate the high frequency assist gain by maintaining it as it is in the case where a steering state of the steering wheel is not the steering reversal state.

The compensated high frequency assist gain may be used in compensating the high frequency characteristic of the assist torque by being added with the primarily compensated assist torque as will be described later. Due to this fact, high frequency responsiveness may be improved, and thereby, a sticky steering feel felt by the driver as an instantaneous load is generated due to friction, inertia or lack of responsiveness of the MDPS motor in the mechanism at the time of steering reversal may be reduced.

FIG. 2 is a Bode diagram showing an output variation at the time of steering reversal. As shown in FIG. 2, in the present embodiment, by compensating the high frequency characteristic through the high frequency compensation gain and thereby improving high frequency responsiveness, a steering feel of the driver at the time of steering reversal may be improved. Also, since the high frequency assist gain is upwardly compensated only at the time of steering reversal, it is possible to prevent a problem that may be incidentally accompanied, such as increase in high frequency noise due to additional compensation.

Next, descriptions will be made for the assist torque compensation block 550.

The assist torque compensation block 550 may play the role of compensating the entire frequency characteristic of the assist torque calculated by the assist torque calculation block 530 at the time of steering reversal, at the time of steering holding and at the time of normal steering. That is to say, the assist torque compensation block 550 may play the role of avoiding a resonance point of the system and determining a compensation characteristic of a compensation filter which is to be described later, depending on the magnitude of the column torque T, thereby optimizing a steering feel of the driver.

As shown in FIG. 1, the assist torque compensation block 550 may include a compensation characteristic gain determining section 551, a reciprocal section 553 and a compensation filter. The compensation filter may include a first compensation filter 555 and a second compensation filer 557. Through this configuration, the assist torque compensation block 550 may determine the compensation characteristic of the compensation filter based on the column torque T and the vehicle speed V, and may compensate the high frequency characteristic of the assist torque calculated by the assist torque calculation block 530, through using the compensation filter of which compensation characteristic is determined and the high frequency assist gain which is compensated by the steering reversal compensation block 510. Hereinbelow, the operation of the assist torque compensation block 550 will be described in detail through the detailed configuration thereof.

The compensation characteristic gain determining section 551 may receive the column torque T and the vehicle speed V and calculate the compensation characteristic gain which determines the compensation characteristic of the compensation filter. The compensation characteristic gain means a parameter that determines whether to set the compensation characteristics of the first compensation filter 555 and the second compensation filter 557 as a lead filter characteristic and a lag filter characteristic, respectively, or a lag filter characteristic and a lead filter characteristic, respectively. The compensation characteristic gain determining section 551 may determine the compensation characteristic gain by using relationship information on compensation characteristic gains for the column torque T and the vehicle speed V, set in advance. The relationship information may be set in advance in the compensation characteristic gain determining section 551 in various schemes such as mapping information between the column torque T and the vehicle speed V and compensation characteristic gains, a lookup table or a function of compensation characteristic gains for the column torque T and the vehicle speed V.

In the present embodiment, the assist torque compensation block 550 may determine the compensation character-istic of the second compensation filter 557 as the lag filter characteristic when the column torque T is smaller than a predetermined reference torque, and may determine the compensation characteristic of the second compensation filter 557 as the lead filter characteristic when the column torque T is equal to or larger than the predetermined reference torque. The assist torque compensation block 550 may determine the compensation characteristic of the second compensation filter 557 by using the compensation characteristic gain determined by the compensation characteristic gain determining section 551, and may determine the compensation characteristic of the first compensation filter 555 by using a compensation characteristic gain that is converted into a reciprocal through the reciprocal section 553. Thereby, the assist torque compensation block 550 may complementarily determine the compensation characteristic of the first compensation filter 555 and the compensation characteristic of the second compensation filter 557.

Describing in detail the operation of the assist torque compensation block 550 with reference to the above descriptions and FIG. 1, the assist torque compensation block 550 may primarily compensate the assist torque outputted from the assist torque calculation block 530, through the first compensation filter 555, and may secondarily compensate a result of adding the primarily compensated assist torque and the high frequency assist gain compensated by the steering reversal compensation block 510, through the second compensation filter 557.

In the case where the column torque T is smaller than the reference torque, the first compensation filter 555 operates as a lead filter and the second compensation filter 557 operates as a lag filter. According to this fact, by lowering low frequency responsiveness and raising high frequency responsiveness, a congruous steering feel may be maintained at the time of steering and reactivity may be improved. Conversely, in the case where the column torque T is equal to or larger than the reference torque, that is, in the case of such a situation in which the driver abruptly steers, the first compensation filter 555 operates as a lag filter and the second compensation filter 557 operates as a lead filter. According to this fact, by raising both low frequency responsiveness and high frequency responsiveness and effectively reducing vibration, a comfortable steering feel may be provided.

Next, descriptions will be made for the steering holding compensation block 570.

As shown in FIG. 1, the steering holding compensation block 570 may include a cutoff frequency determining section 571 and a variable low pass filter 573.

In the case where the driver is holding the steering wheel, a steering feel of the driver may deteriorate as fine vibration and noise are transferred through the steering wheel due to the noise of the column torque sensor 100 and the motor current sensor 400 which detects the current of the MDPS motor. Therefore, in the present embodiment, in the case where a steering state of the steering wheel determined based on the steering angle velocity $\omega$ is the steering holding state, the steering holding compensation block 570 may filter the assist torque (that is, the secondarily compensated assist torque) of which high frequency characteristic is compensated by the assist torque compensation block 550, through the variable low pass filter 573, and thereby, may eliminate the high frequency noise of the assist torque of which high frequency characteristic is compensated. The steering holding compensation block 570 may determine that the driver is holding the steering wheel, in the case where the steering angle velocity $\omega$ converges to 0.

Since steering disturbance by vibration according to the holding of the steering wheel is greater in a stopped condition than when the vehicle travels, the cutoff frequency determining section 571 may determine the cutoff frequency of the variable low pass filter 573 in consideration of the steering angle velocity ω and the vehicle speed V. The cutoff frequency determining section 571 may determine the cutoff frequency of the variable low pass filter 573 by using relationship information on cutoff frequencies for the steering angle velocity ω and the vehicle speed V, set in advance. The relationship information may be set in advance in the cutoff frequency determining section 571 in various schemes such as mapping information between the steering angle velocity ω and the vehicle speed V and cutoff frequencies, a lookup table or a function of cutoff frequencies for the steering angle velocity ω and the vehicle speed V.

Through the above-described way, the vibration generated due to the noise of the column torque sensor 100 and the motor current sensor 400 in the state in which the driver is holding the steering wheel may be effectively eliminated.

Furthermore, the conventional MDPS system is designed to avoid only a resonance frequency corresponding to the resonance point of the system and respond in all the other frequency regions, in normal steering. However, since a frequency region in which the driver is sensitive to steering is generally lower than 100Hz and a high frequency region equal to or higher than 100Hz is a frequency region in which noise due to the sensors provided in the MDPS system or the external environment exists, there is a need to filter the noise of a high frequency region in order to eliminate the steering disturbance of the driver. Thus, the steering holding compensation block 570 may play the role of eliminating the noise of the high frequency region through the variable low pass filter 573.

In other words, the steering holding compensation block 570 may eliminate the high frequency noise of the assist torque of which high frequency characteristic is compensated, by filtering the assist torque of which high frequency characteristic is compensated, through the variable low pass filter 573 of which cutoff frequency is variable. In particular, in the case where a steering state of the steering wheel determined based on the steering angle velocity ω is the steering holding state, the vibration generated in the steering wheel at the time of the steering holding may be effectively reduced by using a method of adjusting the cutoff frequency of the variable low pass filter 573 to a value equal to or less than a predetermined reference frequency.

FIG. 3 is a Bode diagram showing an output variation at the time of steering holding. As shown in FIG. 3, in the present embodiment, when the driver holds steering in a state in which the vehicle is stopped, vibration due to the high frequency noise of the column torque sensor 100 and the motor current sensor 400 may be reduced through the variable low pass filter 573. Further, in the case where the driver starts steering from the steering holding state, by immediately changing the cutoff frequency of the variable low pass filter 573, the responsiveness of the high frequency region may be increased again at the time of steering.

FIG. 4 is a Bode diagram showing an output variation at the time of normal steering. As shown in FIG. 4, when the driver steers normally, the responsiveness of frequency regions other than a frequency region in which the driver is sensitive to steering may be decreased, and high frequency noise by the external environment may be reduced, whereby it is possible to provide an improved steering feel to the driver.

Figure 5:
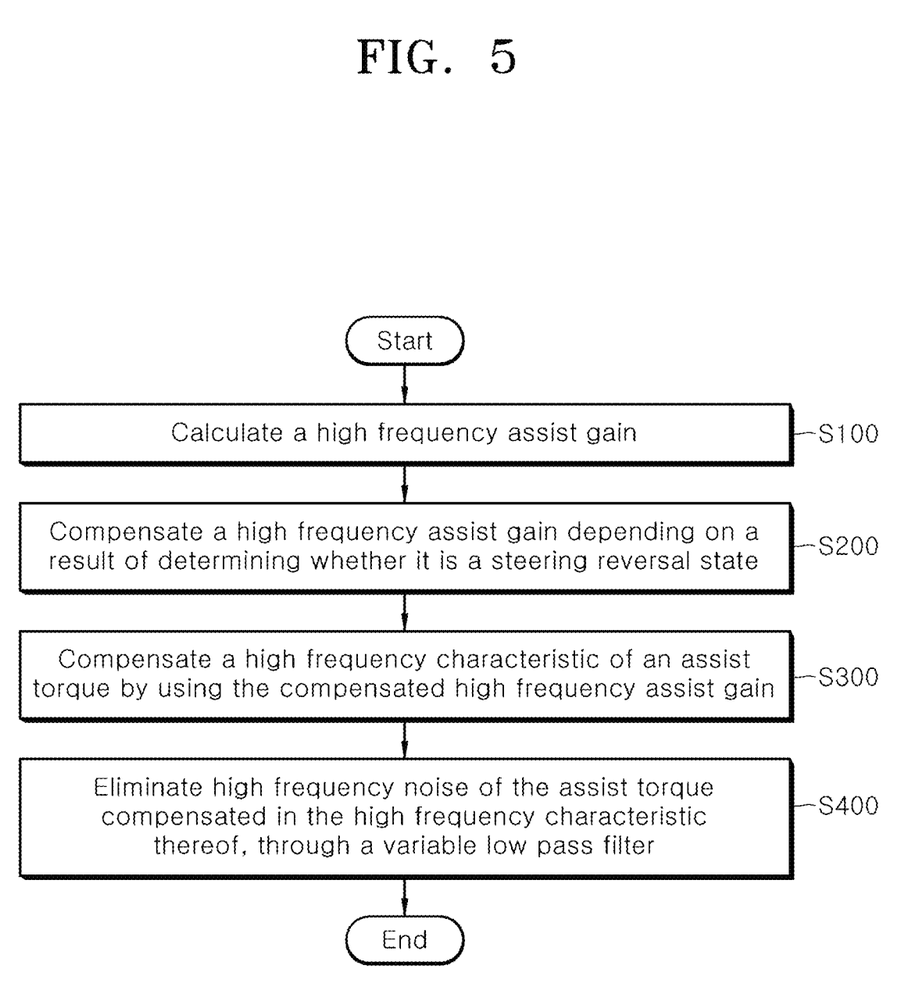
FIG. 5 is a flow chart to assist in the explanation of a method for compensating a torque of a motor-driven power steering system in accordance with an embodiment of the present disclosure.

FIG. 5 is a flow chart to assist in the explanation of a method for compensating a torque of a motor-driven power steering system in accordance with an embodiment of the present disclosure.

Describing the method for compensating a torque of a motor-driven power steering system in accordance with the embodiment of the present disclosure with reference to FIG. 5, first, the control unit 500 calculates a high frequency assist gain for controlling the high frequency region of the column torque T based on the column torque T applied to the steering shaft and the vehicle speed V of the vehicle (S100).

Then, the control unit 500 determines whether a steering state of the steering wheel is a steering reversal state, based on the steering angle velocity ω of the steering wheel and the motor current I applied to the MDPS (motor-driven power steering) motor, and compensates the high frequency assist gain calculated at the step S100, depending on a result of determination (S200).

At the step S200, the control unit 500 may determine that a steering state of the steering wheel is the steering reversal state, when the steering angle acceleration calculated by differentiating the steering angle velocity ω with respect to time converges to the value of 0 and the magnitude of the motor current I is equal to or larger than the predetermined reference. Further, the control unit 500 may upwardly compensate the high frequency assist gain in the case where a steering state of the steering wheel is the steering reversal state, and may compensate the high frequency assist gain by maintaining it as it is in the case where a steering state of the steering wheel is not the steering reversal state. Since the process of compensating the high frequency assist gain through the high frequency compensation gain is described above, detailed descriptions thereof will be omitted herein.

In succession, the control unit 500 compensates the high frequency characteristic of the assist torque which is calculated from the column torque T and the vehicle sensor V, by using the high frequency assist gain which is compensated through the step S200 (S300).

At the step S300, the control unit 500 may determine the compensation characteristic of the compensation filter based on the column torque T and the vehicle speed V, and may compensate the high frequency characteristic of the assist torque through using the compensation filter of which compensation characteristic is determined and the high frequency assist gain compensated through the step S200. The compensation filter may include the first compensation filter 555 and the second compensation filter 557. According to this fact, the control unit 500 may primarily compensate the assist torque through the first compensation filter 555, and may secondarily compensate the result of adding the primarily compensated assist torque and the compensated high frequency assist gain through the second compensation filter 557. The compensation characteristics of the first and second compensation filters 555 and 557 may be complementarily determined by the compensation characteristic gain determined depending on the column torque T as described above, and accordingly, an optimized steering feel may be provided to the driver depending on the column torque T. Moreover, because high frequency responsiveness is improved in both the cases where the first and second compensation filters 555 and 557 operate as lead and lag filters, respectively, and lag and lead filters, respectively, a sticky steering feel felt by the driver as an instantaneous load is generated at the time of steering reversal may be reduced.

Next, the control unit 500 eliminates the high frequency noise of the assist torque of which high frequency characteristic is compensated, by filtering the assist torque of which high frequency characteristic is compensated through the step S300, through the variable low pass filter 573 of which cutoff frequency is variable (S400).

The control unit 500 may variably adjust the cutoff frequency of the variable low pass filter 573 based on the steering angle velocity ω and the vehicle speed V. Therefore, in the case of the steering holding state at a stopped condition based on the steering angle velocity ω and the vehicle speed V, the vibration generated in the steering wheel may be reduced, and furthermore, high frequency noise at the normal steering state may also be eliminated.

As is apparent from the above descriptions, according to the embodiments of the present disclosure, without using a separate mechanical apparatus for improving a steering feel of a driver, a steering feel of a driver in a steering reversal state or a steering holding state may be improved by applying only a logic which compensates a frequency characteristic of a column torque, and the steering feel of the driver may be optimized in real time by variably compensating the frequency characteristic of the column torque depending on a steering state of the driver.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for compensating a torque of a motor-driven power steering (MDPS) system of a vehicle, comprising:
   a column torque sensor configured to sense a column torque applied to a steering shaft of the vehicle;
   a vehicle speed sensor configured to sense a vehicle speed of the vehicle;
   a steering angle sensor configured to sense an angular speed of a steering wheel of the vehicle;
   a motor current sensor configured to sense a current in a motor of the MDPS system; and
   a control unit configured to compute an assist torque for driving the motor using the column torque and the vehicle speed,
   wherein the control unit is further configured to:
      compute a high-frequency assist gain using the column torque and the vehicle speed for use in computing a high-frequency component of the assist torque having a frequency greater than 100 Hz,
      compute an angular acceleration using the angular speed,
      determine whether the angular acceleration converges to zero,
      determine whether the current in the motor is greater than a predetermined reference,
      in response to a determination that the angular acceleration converges to zero and that the current is greater than the predetermined reference, determine that the MDPS system is in a steering reversal state
      when determined that the MDPS system is in the steering reversal state, multiply a predetermined compensation gain greater than 1 to the high-frequency assist gain to obtain an increased assist gain and compute the assist torque using the increased assist gain, and
      whereas when it is not determined that the MDPS system is in the steering reversal state, compute the assist torque using the high-frequency assist gain without multiplying the predetermined compensation gain to the high-frequency assist gain such that the predetermined compensation gain is multiplied for enhancing steering responsiveness in a high frequency range greater 100 Hz only when the MDPS system is in the steering reversal state rather than when the MDPS system is not in the steering reversal state.

2. The apparatus according to claim 1, wherein the control unit is configured to determine a compensation characteristic of a compensation filter based on the column torque and the vehicle speed, and a high frequency characteristic of the assist torque using the compensation filter.

3. The apparatus according to claim 2,
   wherein the compensation filter comprises a first compensation filter and a second compensation filter, and
   wherein the control unit is configured to compensate the assist torque through the first compensation filter, and is further configured to secondarily compensate a result of adding the primarily compensated assist torque and the compensated high frequency assist gain, through the second compensation filter.

4. The apparatus according to claim 3, wherein the control unit is configured to determine a compensation characteristic of the second compensation filter as a lag filter characteristic when the column torque is smaller than a predetermined reference torque and as a lead filter characteristic when the column torque is equal to or larger than the predetermined reference torque,
   wherein the control unit is further configured to determine a compensation characteristic of the first compensation filter complementarily to the compensation characteristic of the second compensation filter.

5. The apparatus according to claim 2, wherein the control unit is configured to eliminate high frequency noise of the assist torque by filtering the assist torque, through a variable low pass filter (VLPF) of which cutoff frequency is variable.

6. The apparatus according to claim 5, wherein the control unit is configured to adjust the cutoff frequency of the variable low pass filter based on the angular speed and the vehicle speed.

7. The apparatus according to claim 6, wherein the control unit is configured to adjust the cutoff frequency of the variable low pass filter to a value equal to or smaller than a predetermined reference frequency, in the case where a steering state of the steering wheel determined based on the angular speed is a steering holding state.

8. A method for controlling a motor-driven power steering system (MDPS) of a vehicle, comprising:
   sensing, using a column torque sensor, a column torque applied to a steering shaft of the vehicle;
   sensing, using a vehicle speed sensor, a vehicle speed of the vehicle;
   sensing, using a steering angle sensor, an angular speed of a steering wheel of the vehicle;
   sensing, using a motor current sensor, a current in a motor of the MDPS system; and
   computing, using a control unit, an assist torque for driving the motor using the column torque and the vehicle speed,
   wherein computing the assist torque comprises:
      computing a high-frequency assist gain using the column torque and the vehicle speed for use in computing a high-frequency component of the assist torque greater than 100 Hz,
      computing an angular acceleration using the angular speed, determining whether the angular acceleration converges to zero, determining whether the current in the motor is greater than a predetermined reference, in response to a determination that the angular acceleration converges to zero and that the current is greater than the predetermined reference, determining that the MDPS system is in a steering reversal state, when determined that the MDPS system is in the steering reversal state, multiplying a predetermined compensation gain greater than 1 to the high-frequency assist gain to obtain an increased assist gain and computing the assist torque using the increased assist gain, and whereas when it is not determined that the MDPS system is in the steering reversal state, computing the assist torque using the high-frequency assist gain without multiplying the predetermined compensation gain to the high-frequency assist gain such that the predetermined compensation gain is multiplied for enhancing steering responsiveness in a high frequency range greater 100 Hz only when the MDPS system is in the steering reversal state rather than when the MDPS system is not in the steering reversal state.

9. The method according to claim 8, wherein the control unit determines a compensation characteristic of a compensation filter based on the column torque and the vehicle speed, and compensates a high frequency characteristic of the assist torque using the compensation filter.

10. The method according to claim 9, wherein the compensation filter comprises a first compensation filter and a second compensation filter, and wherein the control unit primarily compensates the assist torque through the first compensation filter, and secondarily compensates a result of adding the primarily compensated assist torque and the compensated high frequency assist gain, through the second compensation filter.

11. The method according to claim 10, wherein the control unit determines a compensation characteristic of the second compensation filter as a lag filter characteristic when the column torque is smaller than a predetermined reference torque and as a lead filter characteristic when the column torque is equal to or larger than the predetermined reference torque, and determines a compensation characteristic of the first compensation filter complementarily to the compensation characteristic of the second compensation filter.

12. The method according to claim 9, further comprising:

eliminating high frequency noise of the assist torque by filtering the assist torque through a variable low pass filter (VLPF) of which cutoff frequency is variable, by the control unit.

13. The method according to claim 12, wherein, the control unit variably adjusts the cutoff frequency of the variable low pass filter based on the angular speed and the vehicle speed.

* * * * *